(12) United States Patent
Luciano

(10) Patent No.: US 10,413,079 B2
(45) Date of Patent: Sep. 17, 2019

(54) VOICE-ACTIVATED BED FRAME ILLUMINATION WITH SMART PHONE CONTROL AND RELATED STRUCTURES

(71) Applicant: Sebastian Luciano, Queensbury, NY (US)

(72) Inventor: Sebastian Luciano, Queensbury, NY (US)

( * ) Notice: Subject to any disclaimer, the term of this patent is extended or adjusted under 35 U.S.C. 154(b) by 0 days.

(21) Appl. No.: 15/962,430

(22) Filed: Apr. 25, 2018

(65) Prior Publication Data

US 2018/0249840 A1    Sep. 6, 2018

Related U.S. Application Data

(63) Continuation of application No. 15/496,433, filed on Apr. 25, 2017, now abandoned, which is a
(Continued)

(51) Int. Cl.
*G08B 17/12* (2006.01)
*G08B 17/00* (2006.01)
(Continued)

(52) U.S. Cl.
CPC .......... *A47C 21/003* (2013.01); *A47C 31/008* (2013.01); *G08B 7/062* (2013.01); *G09F 13/00* (2013.01); *H05B 37/0218* (2013.01); *H05B 37/0227* (2013.01); *H05B 37/0236* (2013.01); *H05B 37/0245* (2013.01); *H05B 37/0272* (2013.01); *H05B 37/0281* (2013.01); *Y02B 20/46* (2013.01); *Y02B 20/48* (2013.01)

(58) Field of Classification Search
CPC .................................................. A47C 21/003
See application file for complete search history.

(56) References Cited

U.S. PATENT DOCUMENTS 4,947,298 A    8/1990   Stephen
6,234,642 B1   5/2001   Bokämper
(Continued)

FOREIGN PATENT DOCUMENTS

DE    202005017862 U1   3/2006
EP        1857737 A1   11/2007
FR        2982135 B1    5/2013

*Primary Examiner* — Joseph H Feild
*Assistant Examiner* — Pameshanand Mahase
(74) *Attorney, Agent, or Firm* — Barclay Damon LLP

(57) ABSTRACT

Bed structures are presented. The bed structure may include a bed frame for supporting at least one of a mattress or a mattress foundation, at least one illumination device mounted on the bed frame, and a control system. The control system includes at least one sensor and being configured to illuminate the at least one illumination device responsive to predetermined environmental conditions determined by the at least one sensor. In another aspect, a bed structure includes at least one illumination device mounted on the bed frame, and a control system configured to illuminate the at least one illumination device responsive to predetermined environmental conditions. The control system includes a motion sensor, a light sensor, a timer, and a remote control system facilitating operation of the at least one illumination device responsive to user input control or a predetermined control sequence.

2 Claims, 9 Drawing Sheets

Related U.S. Application Data continuation of application No. 15/215,742, filed on Jul. 21, 2016, now Pat. No. 9,661,931.

(60) Provisional application No. 62/194,975, filed on Jul. 21, 2015.

(51) Int. Cl.
| | | |
|---|---|---|
| *G08B 17/06* | (2006.01) | |
| *G08B 17/10* | (2006.01) | |
| *A47C 21/00* | (2006.01) | |
| *A47C 31/00* | (2006.01) | |
| *H05B 37/02* | (2006.01) | |
| *G08B 7/06* | (2006.01) | |
| *G09F 13/00* | (2006.01) | |

(56) References Cited

U.S. PATENT DOCUMENTS

| | | |
|---|---|---|
| 6,578,214 B2 | 6/2003 | Peftoulidis |
| 7,268,682 B2 | 9/2007 | Bialecki, Jr. et al. |
| 7,874,695 B2 | 1/2011 | Jensen |
| 8,134,473 B2 | 3/2012 | Roussy |
| 8,253,338 B2 | 8/2012 | Ashoff et al. |
| 8,410,943 B2 | 4/2013 | Metz et al. |
| 2004/0065813 A1 | 4/2004 | Goldstein |
| 2004/0257237 A1* | 12/2004 | Bialecki, Jr. ........... G08B 21/22 340/686.1 |
| 2005/0243556 A1 | 11/2005 | Lynch |
| 2005/0258954 A1 | 11/2005 | Ruskin |
| 2011/0157486 A1* | 6/2011 | Murata ................... G08B 7/062 348/744 |
| 2011/0203147 A1 | 8/2011 | Van Herpen et al. |
| 2012/0074867 A1* | 3/2012 | Shih .................... H05B 33/0809 315/294 |
| 2013/0049966 A1 | 2/2013 | Penninger et al. |
| 2014/0340222 A1* | 11/2014 | Thornton ............... G08B 7/062 340/539.17 |
| 2014/0371635 A1 | 12/2014 | Shinar et al. |
| 2016/0007430 A1* | 1/2016 | Kidakarn ........... H05B 37/0272 315/185 S |
| 2016/0037611 A1* | 2/2016 | Min .................... H05B 33/0842 315/152 |
| 2016/0135271 A1* | 5/2016 | Alexander ......... H05B 37/0272 315/297 |

* cited by examiner

VOICE-ACTIVATED BED FRAME ILLUMINATION WITH SMART PHONE CONTROL AND RELATED STRUCTURES

CROSS-REFERENCE TO RELATED APPLICATION

This application is a continuation application of U.S. Ser. No. 15/496,433, filed Apr. 25, 2017, which is a continuation application of U.S. Ser. No. 15/215,742, filed Jul. 21, 2016, now U.S. Pat. No. 9,661,931, which claims priority to U.S. Provisional Patent Application Ser. No. 62/194,975, filed Jul. 21, 2015, each of which is incorporated herein by reference in its entirety.

BACKGROUND

Beds and bedding systems in general are of specific importance in the hospitality industry because they provide key aspects of comfort and ergonomics, e.g., the look of guest rooms. Over the past several decades, the hospitality industry has shifted away from the use of simplistic bed bases adorned with bed skirts, towards exposed bed bases. One driver of this shift has been the industry's move away from monolithic comforters and towards layered sheeting, such as triple sheeting.

For example, triple sheeting is a style of bed-making in which several layers of sheets, blankets, duvets, bedspreads, etc., are used instead of a traditional comforter. Such a configuration promotes hygiene by facilitating easy laundering of sheets. In such a case, due to the manner in which a bed is made, the bed base may be exposed when the bed is made, for example because the triple sheeting may be tucked into the bed. An exposed bed base offers opportunities to enhance elegance and functionality of bed bases and related systems.

BRIEF SUMMARY

The shortcomings of the prior art are overcome, and additional advantages are provided, through the provision, in one aspect, of a bed structure. The bed structure includes a bed frame for supporting at least one of a mattress or a mattress foundation, at least one illumination device mounted on the bed frame, and a control system. The control system includes at least one sensor and being configured to illuminate the at least one illumination device responsive to predetermined environmental conditions determined by the at least one sensor.

In another aspect, a bed structure includes a bed frame for supporting at least one of a mattress or a mattress foundation, at least one illumination device mounted on the bed frame, and a control system configured to illuminate the at least one illumination device responsive to predetermined environmental conditions. The control system includes a motion sensor, a light sensor, a timer, and a remote control system facilitating operation of the at least one illumination device responsive to user input control or a predetermined control sequence.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
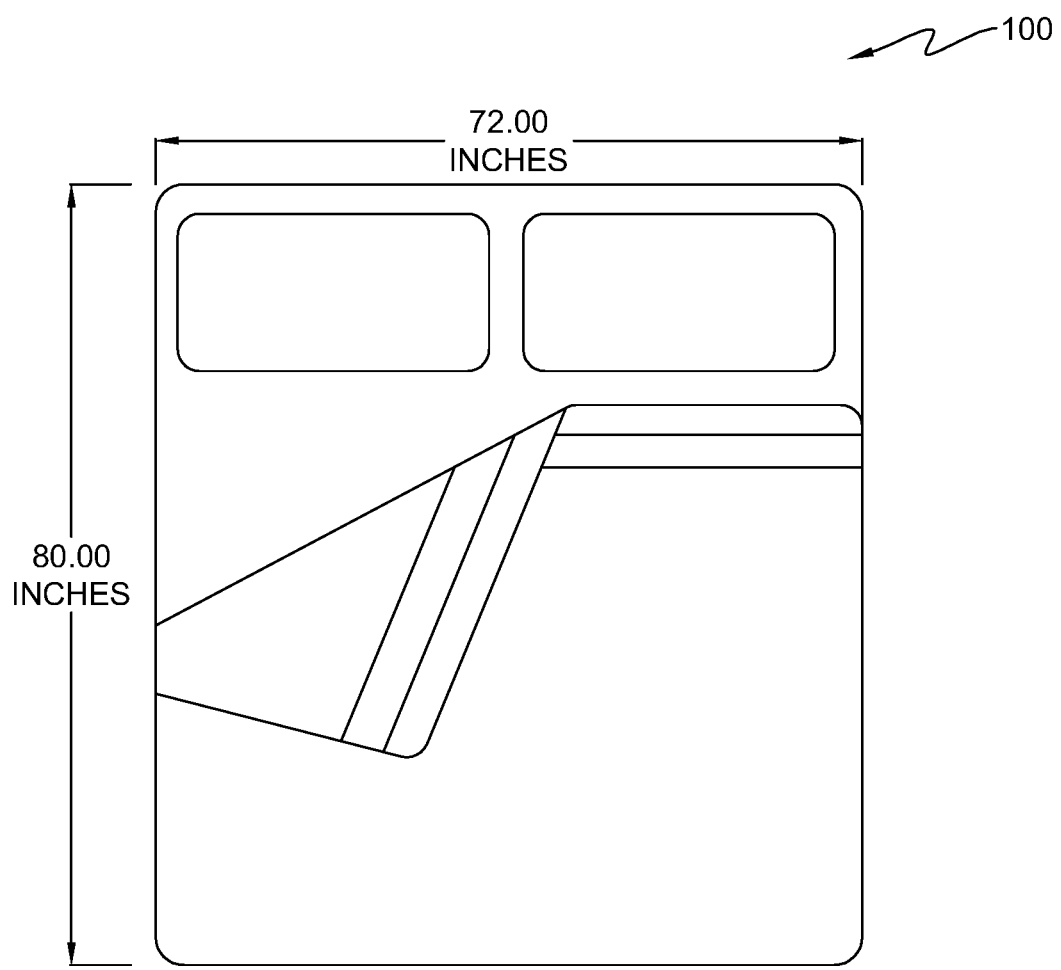
FIG. 1A depicts a bed structure, in accordance with aspects set forth herein.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, illuminated bed structures, for example, for use in the hospitality industry. As the industry has moved away from the use of comforters, bed bases have been exposed. The use of bed skirts in such a case is not favored due to aesthetic considerations. In addition, a bedroom or a guest room may present safety hazards, such as tripping hazards and other obstacles at or near floor level, leading to potential injuries. Night lights have been used to provide some illumination, but due to awkward, static placement, and lack of automated control, their benefits are extremely limited.

Other examples of problems to be solved by one or more aspects of the present invention include facilitating movement with low visibility, for example for handicapped persons, to prevent risks of stumbling and resultant injuries.

Therefore, an opportunity exists to provide multifunctional bed bases which can combine various safety and ergonomic functions. As described herein, an illuminated bed base may include a structure to support a foundation of a bedding system and illuminate surrounding flooring for safety and/or aesthetic purposes. A bedding system supported by the bed base may include a box spring or foundation, a mattress, linens, pillow, decorative coverings, and the like.

In one embodiment, a bed base includes a motion sensor, a light sensor, and a light source. In such a case, if motion is detected when brightness is very low, a light source may be switched on. In another example, the light source may be extinguished after a predetermined time interval, or according to a schedule.

In another embodiment, a bed base may include a clip-on device which may be located in the legs or supports of a bed frame. For instance, such devices may be powered by a battery or electric power. Specifically, in one embodiment, such devices may be integrated with another furniture near the bedding, such as a cabinet, for example.

Advantageously, the present disclosure provides bed bases in which illumination systems may be mounted flush with structural portions, preventing unsightly and potentially dangerous protrusions. For example, by eliminating such protrusions, the risk of injury to a guest may be mitigated, for example by eliminating the possibility of contact with parts of the body such as shins, ankles, etc. In addition, the present disclosure provides for optimal placement of sensors because the sensors are integrated within a bed base, rather than being an adjunct thereto. In addition, integrated solutions as described herein reduce the risk of fire from exposed wiring which may become worn, or thermal damage due to incompatible placement of, for example, clip-on style illumination.

As another advantage, the bed bases or structures described herein may be used in conjunction with home automation technology. For example, various illumination scenes and preprogrammed or predetermined scenarios may be used so that the bed structures are illuminated in a particular manner at different times of day, in reaction to different environmental conditions, detected motion, etc.

By way of example, bed bases as described herein may be used in various settings. For example, hospitality, residential, healthcare applications may all provide guests with enhanced safety and sources of lighting. In one or more embodiments, a low voltage illumination system is a safety feature that allows guests to navigate in the darkness and avoid falls and injuries.

Generally stated, provided herein, in one aspect is a bed structure. The bed structure includes a bed frame for supporting at least one of a mattress or a mattress foundation, at least one illumination device mounted on the bed frame, and a control system. The control system includes at least one sensor and being configured to illuminate the at least one illumination device responsive to predetermined environmental conditions determined by the at least one sensor. Advantageously, the bed structure combines the mechanical support aspects for supporting a mattress or a mattress foundation with the illumination aspects of lighting the bed structure itself or a surrounding environment.

In one embodiment, the at least one bed frame includes multiple bed frames, the at least one illumination device includes multiple illumination devices, and the control system is configured to individually illuminate the multiple illumination devices of the multiple bed frames responsive to different environmental conditions near each of the multiple illumination devices. Advantageously, the bed structure allows a single control system to control numerous illumination devices which may operate together or independently.

In another embodiment, the bed structure further includes a motion sensor, where the control system is configured to illuminate the at least one illumination device responsive to motion detected by the motion sensor. Advantageously, the motion sensor allows detection of motion towards the bed structure, away from the bed structure or near the bed structure In a further embodiment, the bed structure further includes a light sensor, where the control system is configured to illuminate the at least one illumination device responsive to light detected by the light sensor. Advantageously, the light sensor allows for the illumination devices to compensate for a lack of ambient light, or to detect the time of day in order to change the illumination, the colors, the brightness, or other such aspects.

In one example, the bed structure further includes a timer, where the control system is configured to illuminate the at least one illumination device responsive to an event from the timer. Advantageously, the timer allows for sophisticated programs that are based on either the time of day, the day of the week, the last intervals since a previously detected sensor event, or some combination thereof.

In another example, the bed structure further includes a remote control system, the remote control system facilitating operation of the at least one illumination device responsive to user input control or a predetermined control sequence. Advantageously, the remote control allows a user to configure various aspects of the bed structure including the control system.

In a further example, the at least one bed frame includes multiple bed frames, and the multiple bed frames of the bed base are configured to support the at least one mattress or mattress foundation. Advantageously, the flexible configuration of the bed structures described herein allows for deployment in a variety of environments in which different sized beds are required.

In another aspect, a bed structure includes a bed frame for supporting at least one of a mattress or a mattress foundation, at least one illumination device mounted on the bed frame, and a control system configured to illuminate the at least one illumination device responsive to predetermined environmental conditions. The control system includes a motion sensor, a light sensor, a timer, and a remote control system facilitating operation of the at least one illumination device responsive to user input control or a predetermined control sequence. Advantageously, the bed structure allows a combination of motion, light, timer and other sensor data to be used by the control system to change a scene or scenario of illumination.

In one embodiment, the control system is configured to perform a method, the method including the following steps: detecting motion on the bed structure, detecting ambient light near the bed structure, and illuminating, responsive to the detected motion indicating movement away from the bed structure, the at least one illumination device.

In another embodiment, the control system is configured to select a preconfigured lighting scene based on a combination of motion sensor data, light sensor data and timer data, wherein the preconfigured lighting scene comprises one or more of lighting duration, brightness, color, or illumination device selection.

Reference is made below to the drawings, which are not drawn to scale for ease of understanding, wherein the same reference numbers used throughout different figures designate the same or similar components.

Figure 1B:
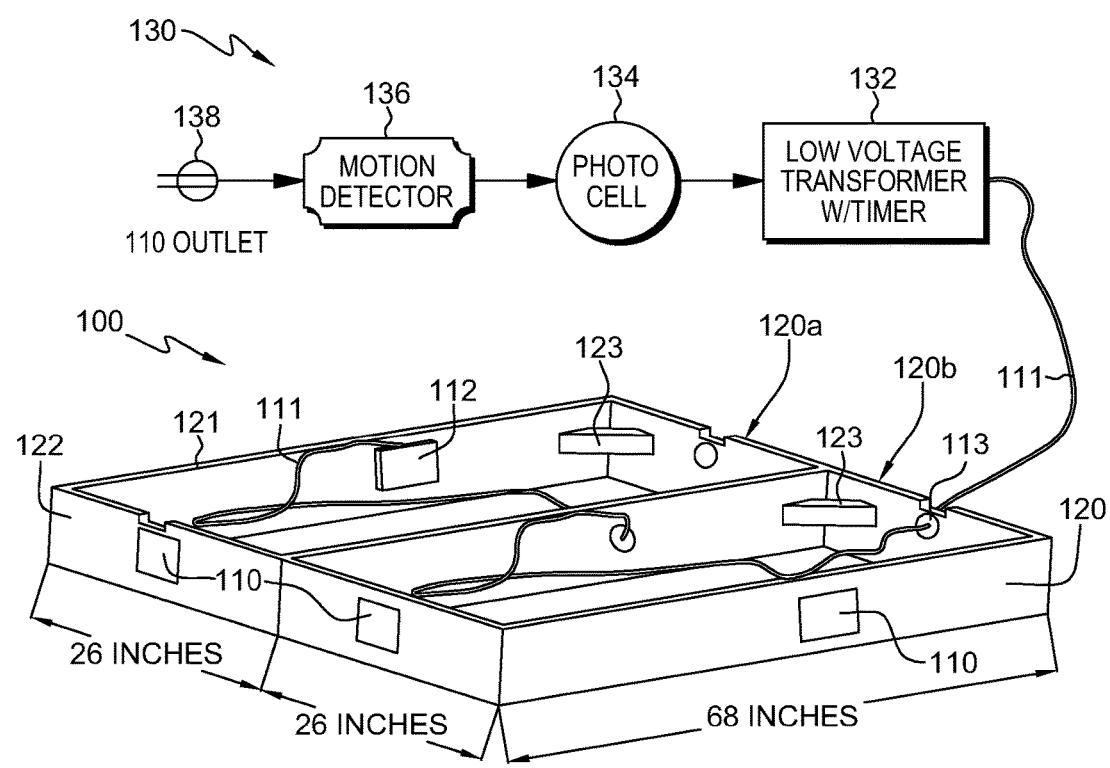
FIG. 1B depicts the bed structure of FIG. 1A including illumination devices and a control system, in accordance with aspects set forth herein.
Figure 1C:
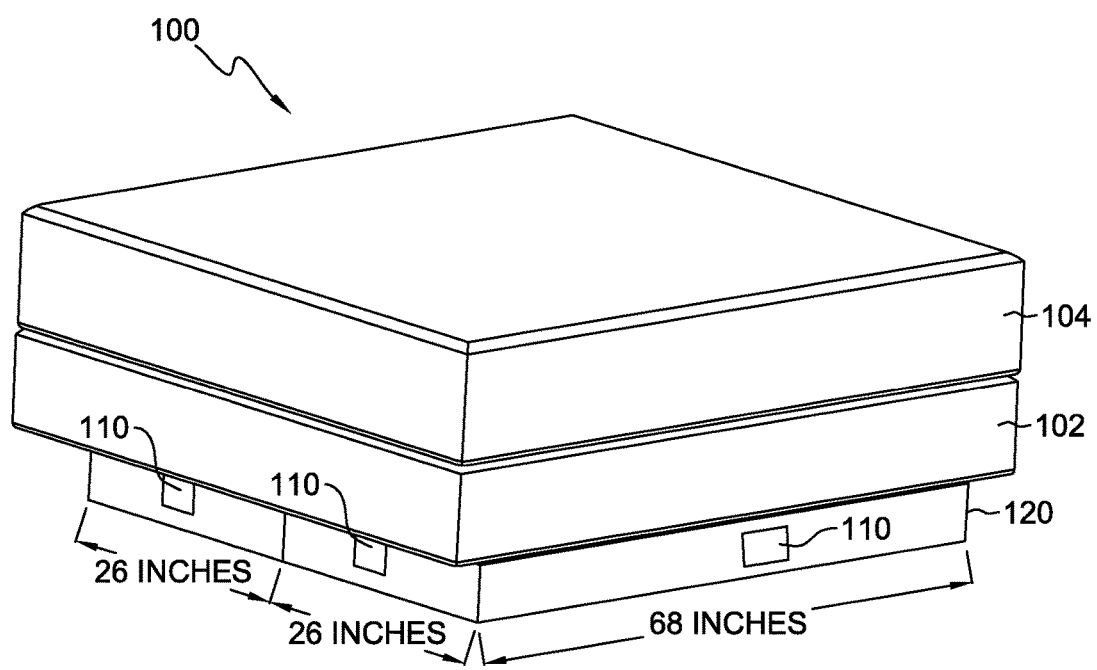
FIG. 1C is an isometric view of the bed structure of FIG. 1A, the accordance with aspects set forth herein.

FIGS. 1A-1C depict a bed structure (or base) 100, in accordance with aspects set forth herein. In the embodiment of FIG. 1B, the bed structure 100 includes illumination devices 110 and a control system 130. The bed structure 100 includes a bed frame 120, and the bed frame 120 includes rails 121, 122. The bed frame 120 may include multiple portions such as bed frame portions 120a, 120b. Different configurations, which may be rectangular, curved, circular, etc., may be used depending upon the desired shape of bed structure 100. The control system 130 may be or include a computer processor for executing program instructions, or may be or include a dedicated programmable logic device.

As depicted, the illumination devices 110 are flush mounted on the bed frame 120. In other embodiments, as described herein, the illumination devices may be mounted in a different manner such as extending from bed frame 120. Continuing with the detail of the bed structure 100 as depicted in FIG. 1B, a housing 112 may contain various electronic circuitry, light bulbs, light emitting diodes, or other illumination components.

As illustrated in FIG. 1C, the bed frame 120 can support a mattress 104 and a mattress foundation 102. With respect to FIG. 1B, the control system 130 includes at least one sensor, such as motion detector 136 or photo cell 134. The control system 130 is configured to illuminate illumination devices 110 responsive to predetermined environmental conditions which are determined by the sensors.

For example, if the motion detector 136 detects motion such as a person stepping off a bed structure 100, control system 130 made then illuminate the illumination devices 110. In such a case, the illumination devices 110 may be illuminated for a period of time that has been predetermined, or may be illuminated as long as motion continues to be detected by the motion detector 136. In another example, if the photo cell 134 detects ambient light, the control system 130 may use that information to either suppress illumination of the illumination devices 110, or illuminate the illumination devices 110, depending upon the level of ambient light detected by the photo cell 134. In one case, the control system 130 may be able to sense that the ambient light is indicative of nighttime, and may illuminate the illumination devices 110 to provide lighting so that a person may get off the bed structure 100 safely, because the illumination devices 110 provide sufficient lighting of the surrounding area, including for example the floor or nearby walls and furniture.

The control system 130 can support various lighting scenarios or scenes using the illumination devices 110 and the sensors such as photo cell 134 and motion detector 136. In one example, the illumination devices 110 may be used to establish mood or ambient lighting, for both aesthetic and safety purposes. For example the photo cell 134 may detect that other lighting within a room, such as a guest room (e.g., in a hotel) in which the bed structure 100 is placed, has dimmed and may then be used to illuminate the illumination devices 110 to provide the ambient lighting.

The illumination devices 110 may include wiring 111 to the control system 130, including to a low-voltage transformer 132 for connection to an AC power source 138 or alternatively to battery power. The wiring 111 may be run through openings 113 within the bed structure 100. Low-voltage transformer 132 may include a timer. The timer can be used to program certain times of day during which various scenes or scenarios for lighting may be operable. Further information regarding such scenes or scenarios is provided herein with respect to FIG. 7.

In one or more embodiments, an illumination automation system may be included which combines motion detection and photo cell technology. For instance, upon detection of motion, such as movement of a guest near the bed base, the motion detection technology can activate the photo cell technology, and activate illumination if the room is below a predetermined lighting threshold.

The photo cell 134 may be or include any photodetector, and may be used to sense light or other electromagnetic energy. The motion detector 136 may be an infrared sensor, microwave detector, ultrasonic detector, tomographic motion detector, or a video based detector.

Other sensors that may be part of control system 130 are pressure sensors, humidity sensors, gas sensors, acceleration sensors, inertial sensors, displacement sensors, force sensors, color sensors, temperature sensors, or gyroscopic sensors. The illumination device 110 may include any suitable lighting technology such as, neon lighting, LED lighting, fluorescent lighting, rope lighting, track lighting, etc.

Figure 2:
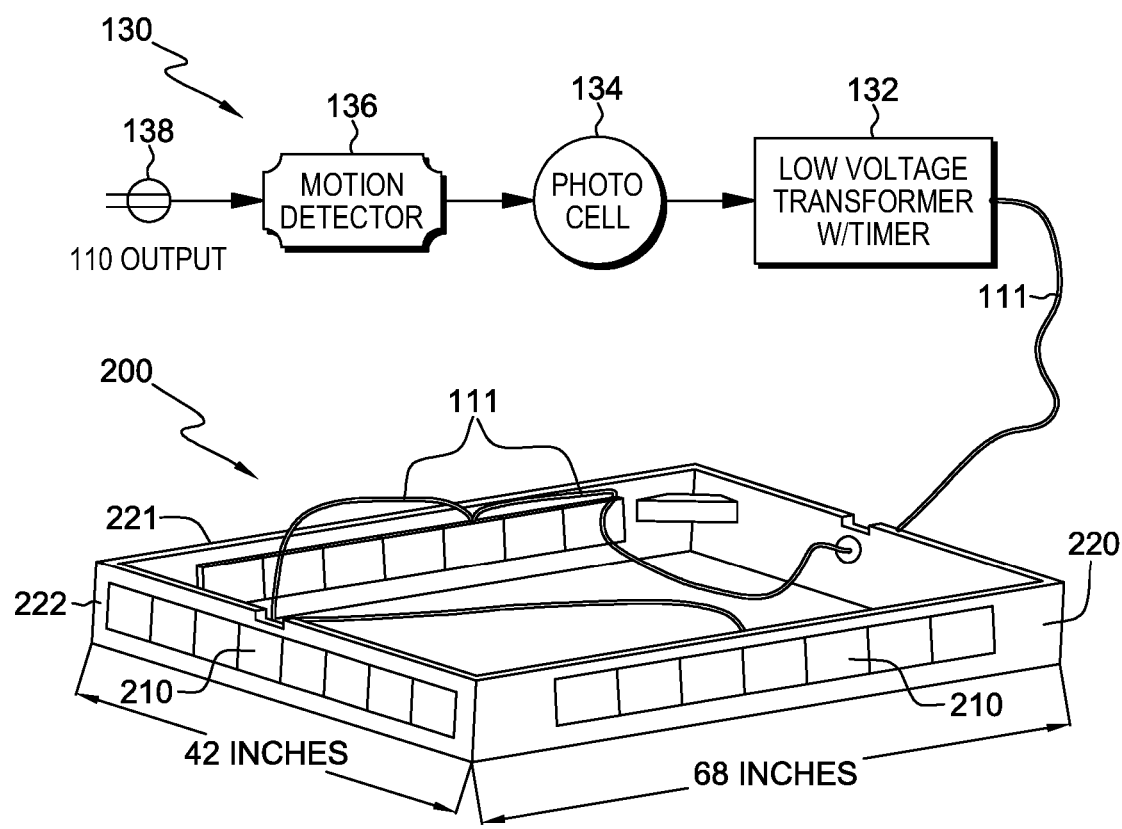
FIGS. 2-5 depict bed structures including illumination devices and control systems, in accordance with aspects set forth herein.

Continuing with the description, FIGS. 2-5 depict different exemplary embodiments of bed structures. FIG. 2 depicts a bed structure 200 including illumination devices 210 and the control system 130, in accordance with aspects set forth herein. In the embodiment of FIG. 2, the bed structure 200 includes multi-paneled illumination devices 210. The multi-paneled illumination devices 210 may include multiple different color light sources with variable brightness levels.

Figure 3:
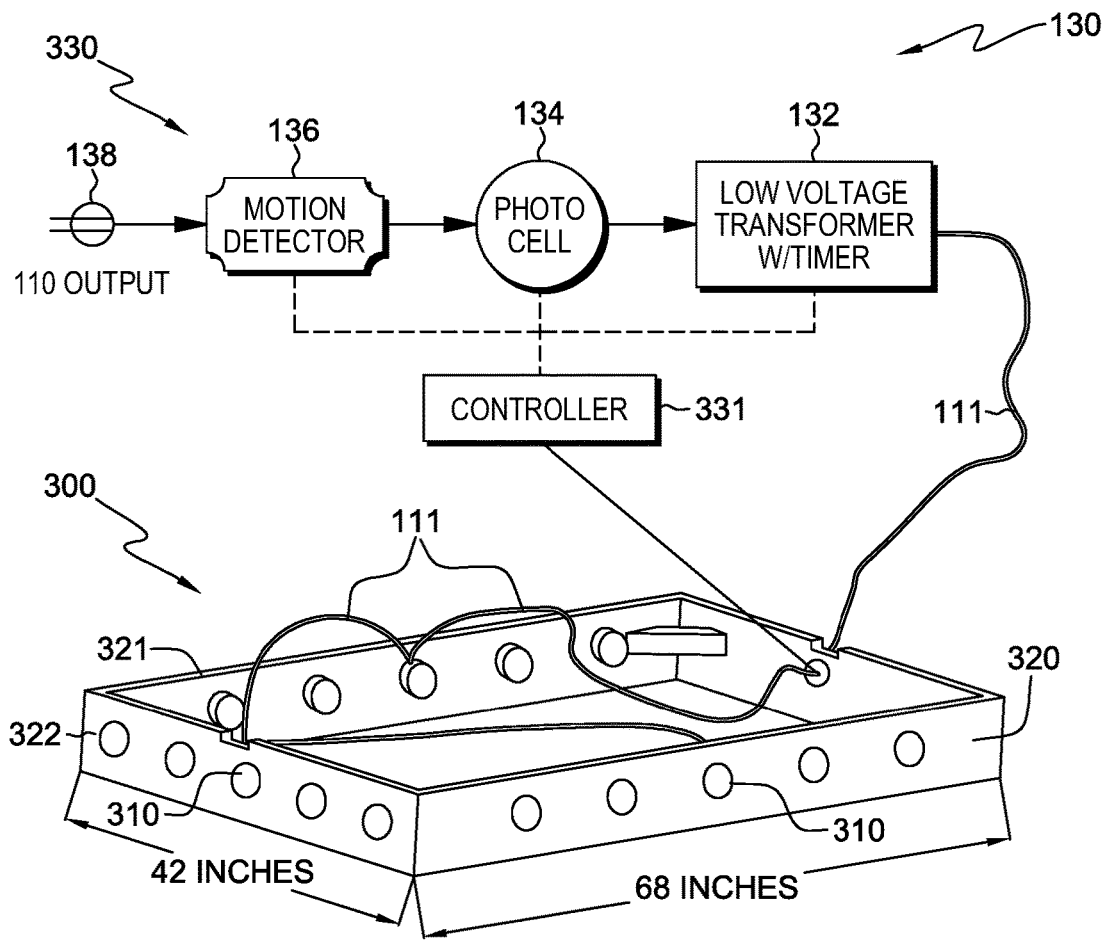

FIG. 3 depicts a bed structure 300 including illumination devices 310 and a control system 330, in accordance with aspects set forth herein. In the embodiment of FIG. 2, the bed structure 300 includes multiple illumination devices 310. The multiple illumination devices 310 may be circular in shape, and may include various color and brightness combinations.

In addition, the control system 330 may also include a controller 331. The controller 331 may include a microprocessor, storage memory, etc. For example, the controller 331, may include an embedded microprocessor to perform the various control functions, including setting of scenes or scenarios for lighting.

Figure 4:
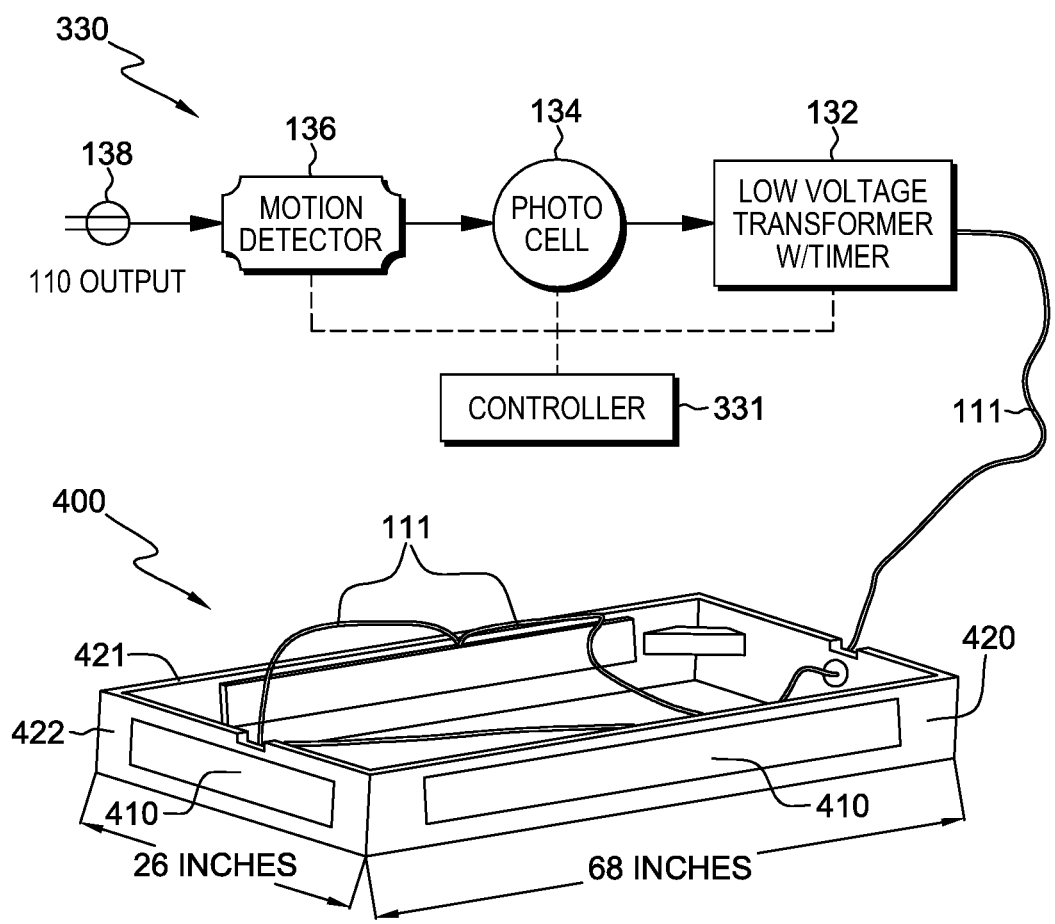

FIG. 4 depicts a bed structure 400 including illumination devices 410 and the control system 330, in accordance with aspects set forth herein. The illumination devices 410 may be a single long panel which can have variable brightness or colors along its length, in response to instructions received from the control system 330

Figure 5:
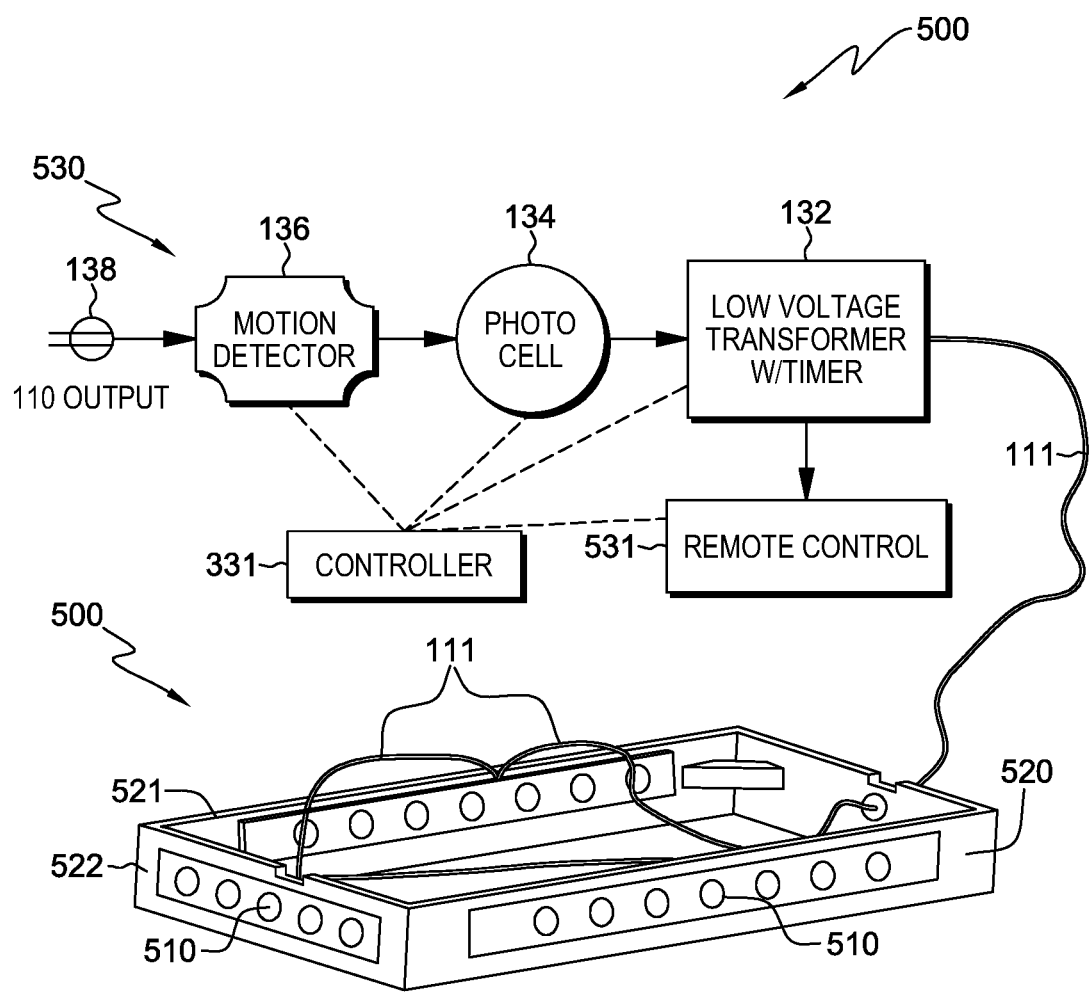

FIG. 5 depicts a bed structure 500 including illumination devices 510 and a control system 530, in accordance with aspects set forth herein. In the embodiment of FIG. 5, the illumination devices 510 may include round lights disposed along a long rectangular panel of lights. Again, each of the individual lights may have different colors or brightness for different applications. In addition, the control system 530 may include a remote control 531. The remote control 531 can be used to program the control system to provide for various lighting scenes or scenarios, as will be further described as respect to FIG. 7 below. For example, the remote control may be integrated with the television set or mobile device, allowing for an on-screen menu to be used in programming the bed structure 500.

Figure 6:
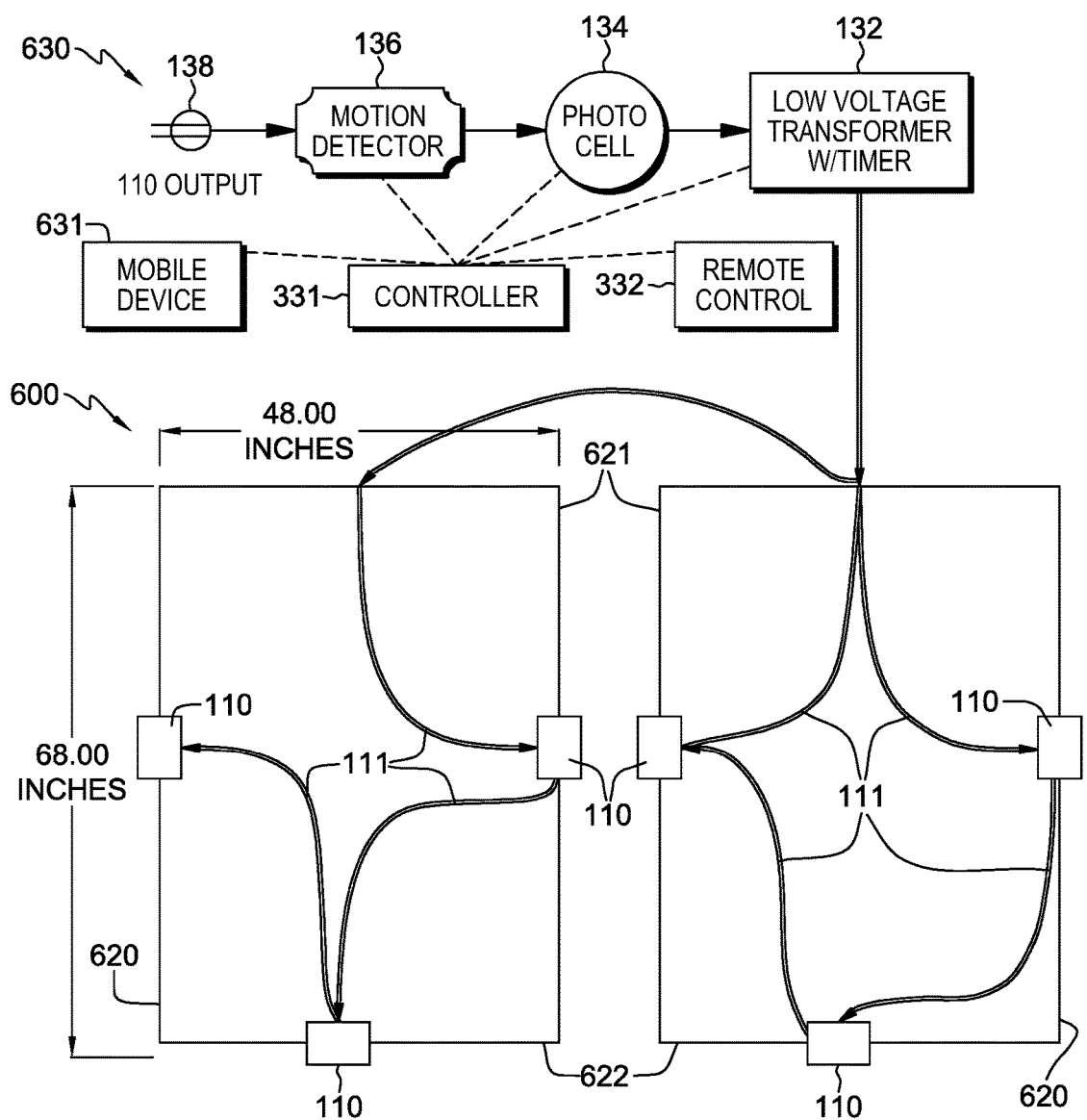
FIG. 6 depicts multiple bed structures including a control system, in accordance with aspects set forth herein.

FIG. 6 depicts a bed structure 600 which can support multiple different mattresses or foundations, such as may be found in a guest room with two beds, in accordance with aspects set forth herein. Bed structure 600 further includes a control system 630. In the embodiment of FIG. 6, control system 630 interfaces to a mobile device 631. For example the mobile device 631 may be a dedicated tablet, a smart phone, or some computing device that may be used to control the various features of bed structure 600.

By way of further explanation, two separate beds in a hospitality guest rooms may share a single control system and share some or all sensors. In addition, in different countries, different mattress sizes may be common, necessitating a modification of the dimensions appropriately. In other examples, a bed base may be non-rectangular, for example to support a custom curved shaped bed, such as a circle or half-moon shape. In addition, a bed base may include supports for removable or extendable portions, such as a trundle bed base.

Figure 7:
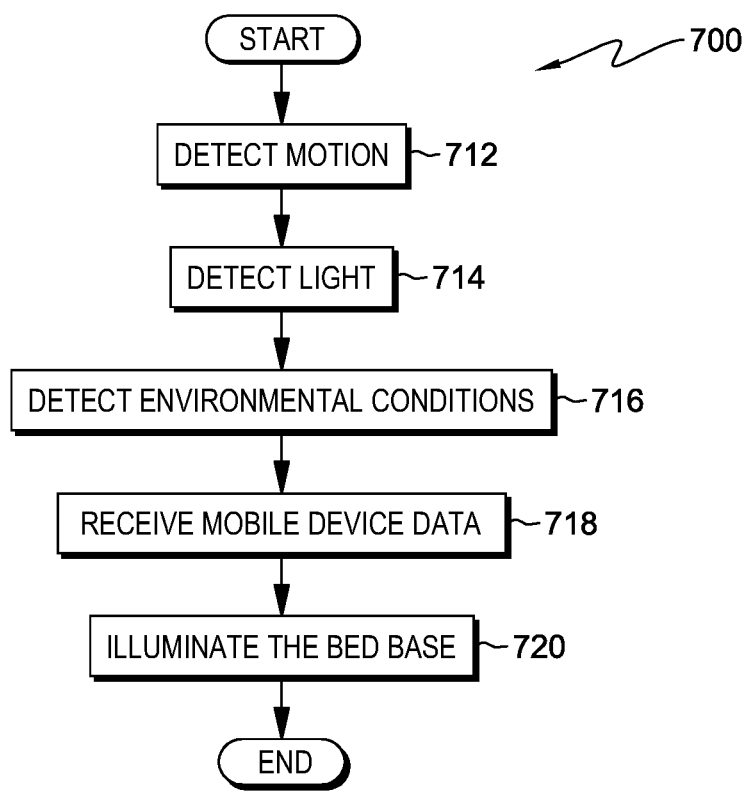
FIG. 7 is a flow chart depicting a method of controlling a bed structure having illumination devices, in accordance with aspects set forth herein.

FIG. 7 is a flow chart depicting a method 700 of controlling a bed structure having illumination devices, in accordance with aspects set forth herein. Controller 331 (see FIGS. 3-6) may include a processor, a memory storage device, and other electronic circuitry sufficient to perform the method 700.

In the embodiment of FIG. 7, the method 700 at block 712 may detect motion, for example, of a person located on top of the bed structure or approaching the bed structure. The method 700 at block 714 may detect the level of ambient light, a change in the ambient light, or the absence of ambient light. The method 700 block 716 may detect various environmental conditions. For example, the bed structure may include various sensors to detect conditions such as temperature or humidity. The method 700 and block 718 may receive mobile device data, for example, from a smart phone or other mobile device. The method 700 at block 720 may illuminate the bed based in response to the various sensed conditions, and other aspects that are programmed within the controller.

By way of further explanation, and to further illustrate various features of the presently disclosed systems and devices, several examples will be now presented. In one example, the bed systems may be used to help a person find their way about an unfamiliar guest room. In such a case, motion sensor data along with ambient light data can be used to determine that an occupant of the bed structure has decided to get out of bed in the middle of the night. Responsive to such a condition, the controller can illuminate the illumination devices at a predetermined brightness so that the person can find their way about the room.

In another example, the bed system may be used to change the décor of a room. In such a case, the timer of the control system may be programmed to set a different scene depending on the time of day. For example, in the evening when a person returns to a guest room the bed system may be set to illuminated in a first color at a first brightness. Alternately, in the morning the bed system may be set to illuminate in a second color at a second brightness.

In a further example, the bed system may be illuminated to indicate the ambient temperature of the room, by making use of temperature data from one of the sensors. For example, and above target temperature room may be indicated using increasingly dark shades of red, whereas a below target temperature room may be indicated using increasingly dark shades of blue. In yet another example, the bed system may be illuminated to indicate an emergency situation.

In another example, the bed system may be programmed using a mobile device. For example, an application may be loaded on the mobile device to provide the user with the menu of choices. The menu of choices may allow the user to select predetermined scenes. The predetermined scenes may include different durations, colors, brightness, etc., of the bed system.

In different implementations, low voltage lighting, such as light emitting diode lighting, may be used to conserve energy and reduce the thermal energy generated by the unit. In one embodiment, a manual on/off switch may be included. In one or more embodiments, a bed base may include surface-mounted lighting, such as low-voltage lighting.

In one embodiment, an audio detection sensor may be included, which can allow activation of illumination based on voice commands, clapping, snapping fingers, etc. In one embodiment, light colors may change in response to input from the sensors due to changes in environmental conditions. In another embodiment, illumination may be tuned to illuminate, for example, a logo of a hospitality company or specific portions of a guest room, such as a front door or a bathroom door upon sensing a change in environmental conditions. For instance, responsive to a fire alarm, the illumination system may immediately fully illuminate the entire room or with a special color or pattern projected on the appropriate door or window for escape from the building.

In one example, a bed base system may include a mobile device application, such as a smartphone application. For instance, the mobile device application may include a series of menus to connect to the bed base and configure the bed base options.

In one or more embodiments, programmable or configurable options of a bed base system may be included. For example, illumination may be programmed to be triggered responsive to presence or absence of motion, time of day, ambient light levels, detection of movement of the bed, etc.

Various embodiments of the present invention may include different fabrication options, such as different sizing and material choices, some of which are now described:

Height Options:

The heights may be 5.0 inches and 7.5 inches. For example, the standard overall bed height of hospitality franchises is 25 inches. Heights can vary to meet these requirements. The overall calculation would require using the mattress depth and foundation/box spring height.

Bed size options (king, queen, x-full, twin, and custom):

The standard overall dimensions of the safe dreams bed base is dependent on the standard sizes of the different bed types (e.g., king, queen, twin, etc.). For example, the bed base may be recessed 6 inches from the foundation edge to allow for ones feet to fit underneath the bedding system for ease of maintenance Foundation Support Options:

Metal cross members can be used, including through reusing existing steel cross members from other bed base systems. These metal cross members may be engineered so as to fit precisely into the bed base to lock in and prevent movement.

Material options include wood, such as pine oak, or maple, plywood, metal, plastic, laminate, cloth, etc. The materials can include various stains or finishes, such as wood stains, paints, etc.

The controller 130 (FIG. 1B) may be or include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An illuminated bed frame for supporting a mattress foundation and a mattress, the illuminated bed frame comprising:
    at least one illumination device, the at least one illumination device being flush mounted to a lower portion of the bed frame, the bed frame surrounding the mattress foundation, wherein the mattress is disposed above the mattress foundation, wherein a vertical distance between the top of the mattress and the top of the mattress foundation is selected to facilitate triple-sheeted bedding disposed on the mattress without covering the at least one illumination device; and
    a control system, the control system comprising a timer and at least one sensor and being configured to receive mobile device data from a mobile device and illuminate the at least one illumination device responsive to one or more of sensed conditions of the at least one sensor or the received mobile device data from the mobile device,
    wherein the at least one sensor comprises a motion detector, a photo cell sensor for detecting light and an audio detection sensor, and the mobile device is programmed to activate the at least one illumination device responsive to one or more of the detection of the motion, the detection of the light and detection of voice activated commands by the audio detection sensor,
    wherein the at least one illumination device comprises multiple different color light sources having variable brightness levels and the mobile device is programmed to activate one or more of the different color light sources at specific brightness levels, and the at least one illumination device illuminates a logo, and
    wherein the control system includes a remote control integrated with a television screen having an on-screen menu, is configured to control the at least one illumination device responsive to determination by the at least one sensor of an occupant movement within the bed structure, and is further configured to illuminate the at least one illumination device with a first scene comprising a first light color and a first light brightness during a first time and day and a second scene comprising a second light color and a second light brightness during a second time of day.

2. A structure comprising:
    a bed frame;
    at least one illumination device mounted on the bed frame;
    a control system, the control system comprising:
    at least one environmental sensor;
    a timer;
    a light sensor; and
    a mobile device for controlling the at least one illumination device and the at least one sensor, the mobile device being configured to control the at least one illumination device responsive to a sensed condition of the at least one environmental sensor, wherein the control system receives mobile device data from the mobile device and selects one or more predetermined scenes of the at least one illumination device,
    wherein the mobile device comprises a smartphone, the smartphone having a menu of choices, the menu of choices including selections for the one or more predetermined scenes,
    wherein the environmental sensor comprises an audio detection sensor, and
    wherein the mobile device comprises an option configuration menu.

* * * * *